(12) United States Patent
Hammes

(10) Patent No.: US 11,804,119 B2
(45) Date of Patent: Oct. 31, 2023

(54) SAFETY SYSTEM AND METHOD USING A SAFETY SYSTEM

(71) Applicant: SICK AG, Waldkirch (DE)

(72) Inventor: Markus Hammes, Waldkirch (DE)

(73) Assignee: SICK AG, Waldkirch (DE)

( * ) Notice: Subject to any disclaimer, the term of this patent is extended or adjusted under 35 U.S.C. 154(b) by 5 days.

(21) Appl. No.: 17/532,073

(22) Filed: Nov. 22, 2021

(65) Prior Publication Data
US 2022/0189274 A1   Jun. 16, 2022

(30) Foreign Application Priority Data
Dec. 16, 2020  (DE) .......................... 102020133787.6

(51) Int. Cl.
| | | |
|---|---|---|
| *G08B 1/08* | (2006.01) | |
| *G08B 21/02* | (2006.01) | |
| *H04W 4/029* | (2018.01) | |
| *G08B 25/10* | (2006.01) | |

(52) U.S. Cl.
CPC ............. *G08B 21/02* (2013.01); *G08B 25/10* (2013.01); *H04W 4/029* (2018.02)

(58) Field of Classification Search
CPC ....... G08B 21/02; G08B 25/10; H04W 4/029; G01S 13/86; G01S 13/93; G01S 15/93; G01S 17/93
USPC ..................................................... 340/539.1
See application file for complete search history.

(56) References Cited

U.S. PATENT DOCUMENTS

| | | | |
|---|---|---|---|
| 10,408,917 B2 | 9/2019 | Ye et al. | |
| 10,410,499 B2 * | 9/2019 | Amir .................. | G08B 13/2491 |
| 2002/0107510 A1 * | 8/2002 | Andrews ................ | A61B 18/20 |
| | | | 372/29.013 |
| 2003/0028323 A1 | 2/2003 | Zeitler et al. | |
| 2011/0205358 A1 * | 8/2011 | Aota ...................... | G01S 19/23 |
| | | | 348/143 |

(Continued)

FOREIGN PATENT DOCUMENTS

| | | |
|---|---|---|
| DE | 102013001987 A1 | 8/2014 |
| DE | 102019100426 A1 | 7/2020 |

(Continued)

OTHER PUBLICATIONS

German Office Action dated Aug. 19, 2021 corresponding to application No. 102020133787.6.

*Primary Examiner* — Tai T Nguyen
(74) *Attorney, Agent, or Firm* — Nath, Goldberg & Meyer; Jerald L. Meyer (57) ABSTRACT

A method using a safety system and a safety system for localizing at least one person or at least one object in a monitored zone, having at least one control and evaluation unit, having at least one radio location system, wherein the radio location system has arranged radio stations; wherein position data of the person or object can be determined by means of the radio location system; wherein the monitored zone has a plurality of sectors and a plurality of passage zones between the sectors, at least one spatially resolving sensor is associated with each passage zone, and wherein the control and evaluation unit is configured to cyclically compare the position data of the radio location system and the presence data of the spatially resolving sensor in each respective passage zone and to cyclically form status information for the sector.

14 Claims, 2 Drawing Sheets

(56) References Cited

U.S. PATENT DOCUMENTS

| | | |
|---|---|---|
| 2014/0197989 A1 | 7/2014 | Hepo-Oja |
| 2016/0056629 A1 | 2/2016 | Baker et al. |
| 2016/0308971 A1* | 10/2016 | Sweeney ............ G06K 19/0705 |
| 2017/0280411 A1* | 9/2017 | Noonan ................ H04W 64/00 |
| 2020/0082551 A1 | 3/2020 | Steiner |

FOREIGN PATENT DOCUMENTS

| | | |
|---|---|---|
| DE | 10 2020 133 788 A1 | 6/2022 |
| EP | 3859382 A1 | 8/2021 |

\* cited by examiner

SAFETY SYSTEM AND METHOD USING A SAFETY SYSTEM

BACKGROUND OF THE INVENTION

The present invention relates to a safety system for localizing at least one person or at least one object in a monitored zone and to a method using a safety system for localizing at least one person or at least one object in a monitored zone.

It is the current practice in industrial safety engineering to manage hazards locally at the hazard site in that an approach or a presence of a person is detected and a machine or travel movement is stopped or the movement is slowed down in a safety relevant manner.

The prior art only describes local safety concepts.

SUMMARY OF THE INVENTION

It is the object of this invention to provide a safety system with which a higher ranking securing function of a number of different hazards can be implemented for an industrial operating environment such as a production facility or a warehouse.

The object is satisfied by a safety system for localizing at least one person or at least one object in a monitored zone, having at least one control and evaluation unit, having at least one radio location system, and having at least one spatially resolving sensor for the position determination of the person or object, wherein the radio location system has arranged radio stations, wherein at least one radio transponder is arranged at the person or object, wherein position data of the person or object can be determined by means of the radio location system, wherein the position data can be transmitted from the radio stations of the radio location system to the control and evaluation unit and at least presence data of the person or of the object can be determined by means of the spatially resolving sensor, wherein the monitored zone has a plurality of sectors and a plurality of passage zones between the sectors, at least one spatially resolving sensor is associated with each passage zone, and wherein the control and evaluation unit is configured to cyclically compare the position data of the radio location system and the presence data of the sensor in each respective passage zone and to cyclically form status information for the sector.

The object is satisfied by a method using a safety system for localizing at least one person or at least one object in a monitored zone, having at least one control and evaluation unit, having at least one radio location system, and having at least one spatially resolving sensor for the position determination of the person or object, wherein the radio location system has arranged radio stations, wherein at least one radio transponder is arranged at the person or object, wherein position data of the person or object can be determined by means of the radio location system, wherein the position data can be transmitted from the radio stations of the radio location system to the control and evaluation unit and at least presence data of the person or of the object can be determined by means of the spatially resolving sensor, wherein the monitored zone has a plurality of sectors and a plurality of passage zones between the sectors, at least one spatially resolving sensor is associated with each passage zone, and wherein the control and evaluation unit is configured to cyclically compare the position data of the radio location system and the presence data of the sensor in each respective passage zone and to cyclically form status information for the sector.

The comparison takes place, for example, triggered by the presence of a person or of an object in the passage zone, i.e. initiated by the event of the protected field infringement of the spatially resolving sensor. An object or a person is namely reliably at the location of the protected field in this case and the control and evaluation unit or an RTLS control or, for example, a safety control can check for this moment whether a radio transponder is located in the passage zone. If this is the case, this radio transponder can be associated with a respective sector when the radio transponder exits the passage zone in the direction of the sector.

Presence data are in the simplest case in this respect binary data of whether a person or an object is present in the passage zone or not.

In accordance with the invention, presence data or position information of present persons that are usable in a technical safety manner are not determined at every point in time and for all positions, but only in the defined passage zones of the monitored zone. The presence data or position information usable in a technical safety manner are thus reduced to the knowledge of the zone or of the passage zones in which a person is located. The position is admittedly likewise known by the radio location within a sector, but is initially not relevant to safety functions due to the missing technical safety check.

The passage zones can also synonymously be called transition zones.

In accordance with the invention, the safe localization of a presence of one or more persons in a passage zone of the operating environment provides great advantages.

The invention assumes, for example, that the operating environment can be divided into different sectors such that transitions are only possible between these sectors via defined passage regions or zones. This requirement is present, for example, at doors or at entrances to shelf aisles.

In addition to the detection of the passing through event, which radio transponders are located in the passage zone or in direct spatial proximity to the corresponding protected field of the spatially resolving sensor at this point in time is detected and the corresponding radio transponder ID is associated with the detected event, for example. The radio transponders detected in the operating environment can thereby be unambiguously and safely associated with a specific passage zone. The resulting status of the corresponding sector is then "Person present" or "Potential hazard" in the corresponding sector.

Conversely, a sector is given the status "Free" or "No hazard" when no radio transponder and thus no person is located in the sector. In this case, machines can, for example, be operated at maximum operating speed, local securing functions can be bridged, or, for example, the corresponding sectors can be declared preferred routes for autonomous vehicles.

The safe presence data or presence information are provided by the spatially resolving sensor with the aid of a presence detection in a defined protected zone, in this case the passage zone. The checking of position information of the radio location is therefore here initially not necessary at all, but is carried out additionally in the fields of vision of the spatially resolving sensor.

In this sense, the relevant question is here therefore not "Where is a person located?", but rather "Are there persons in the sector?" or alternatively "In which sector is the person located?". The information of the radio location system is necessary in addition to the safe presence detection of the spatially resolving sensor because a protected field-based system can admittedly very reliably detect passing through events in the passage zones between sectors, but does not need to be able to remember the passing through events. This means that the case that two persons simultaneously enter a sector, but that then only one person departs the sector again does not have to be distinguished by the spatially resolving sensor from the case in which both persons depart the sector again. This distinction is, however, absolutely necessary for the technical safety use.

This problem can, however, be solved by the use of a radio location system and by the exact association of a detected passing through events of a radio transponder or, for example, of a unique ID of a radio transponder. The safe association is successful in that the independently acquired diverse presence data from the spatially resolving sensor and from the radio location system are compared with one another on passing through the passage zone and it is thus possible to unambiguously and safely deduce which persons or which radio transponder are/is located in a sector or in a passage zone. It is therefore no longer necessary to count passing through events to obtain the information on the presence of persons in a sector. The knowledge of the unique radio transponder and the tracking of these radio transponders in the monitored zone is very much more reliable.

In addition, a degree of plausibility for further technical safety use can be determined from the agreement between the position of the radio location and the presence in the protected zone of the spatially resolving sensor.

The statuses of all the sectors are determined via the control and evaluation unit, a central control, for example, that receives as the input data both the radio transponder positions determined by the radio location system, for example an RTLS system, and the switched information of the protected zones of all the stationary spatially resolving sensors. The control and evaluation unit can, for example, be a safety control or, alternatively, also an unsafe control that uses additional plausibility mechanisms of data processing.

The control and evaluation unit, that is designed as a central control, for example, cyclically continuously carries out the following steps, for example:

1. Determining position information of the radio location system.
2. Detecting information or presence data for passage zones or sector transitions, with this information being determined by the stationary spatially resolving sensors and being transmitted to the control and evaluation unit.
3. On the presence of a passing through events event: Associating between the radio transponder and presence data of the spatially resolving sensor.
4. Setting a status of each sector on the respective hazard status.
5. Optionally, initiating measures to minimize risk for the different sectors.

The detection cycles of the radio location system and of the spatially resolving sensor do not have to be synchronous here. The control and evaluation unit is configured, for example, to transfer the diverse sensor data from the different time patterns into a common time pattern and to carry out a data merging.

The safety statuses of the sectors are pieces of information that can be used in a technical safety manner and can therefore, for example, be used by the higher ranking machine control or controls to initiate risk reduction measures.

The sector-specific status information can be used for risk reduction in different manners:

In accordance with a simple approach, a machine or a travel movement in a sector is stopped, for example, as soon as the sector status signals the presence of a person. This kind of risk reduction has the advantage of low complexity, but suffers from the known productivity losses. Advantages nevertheless result here in that the range limitation of local securing sensors is omitted. An example is the speed limit of very narrow aisle trucks. The speeds of these vehicles are limited by the range of the "moving" protected fields. An enlargement of the fields is not sensible for energetic reasons and for practical application reasons. If, however, the information is present that no person is reliably present in the narrow aisle zone, the speed limitation can be overcome.

Conversely, the sector status can also be expanded by the presence information on moving hazard sites, in particular autonomous vehicles. Persons can thus be warned on an approach to the respective sector or can be prevented from passing through into the sector with the aid of door bolts.

The sector status can also be used for a cascaded risk reduction strategy in which the movements of the machines or vehicles are slowed down on a person entering a sector and there is thus a smaller risk for the person present. This residual risk can then either be acceptable or can be further reduced by supplemental local securing measures. For example by safety sensors having a smaller safety level.

The sector status can additionally be used for dynamic route planning of vehicles. A sector having the status "Free/No person present" can be declared a preferred route. Conversely, a sector with persons present can be blocked for the traveling through of autonomous vehicles and the vehicles can be diverted to other routes.

If the information is present for a sector that no person is located there, the function of local securing sensors can be bridged with this information. This improves the availability of the machines and thus their productivity in that unwanted erroneous shutdowns are avoided.

A securing ring can be laid away from the machine with the aid of the sensor monitoring in an operating environment in which optical sensors cannot be used or can only be used in a very limited manner due to adverse conditions, for example due to dust. I.e. in this case, the securing takes place in that the entry of a person into the environment of the hazardous machine is already detected at the sector boundary and the machine is stopped.

The radio transponders, for example, have identification, with a respective radio transponder being associated with at least one person object or one mobile object, whereby the control and evaluation unit is configured to distinguish and respectively identify the persons and mobile objects.

The spatially resolving sensor and the radio stations are preferably arranged as stationary.

In accordance with the invention, at least one spatially resolving sensor is associated with each passage zone.

The object, a mobile object, a movable machine or mobile machine can, for example, be a guideless vehicle, a driverless vehicle or autonomous vehicle, an automated guided vehicle (AGV), an automated mobile robot (AMR), an industrial mobile robot (IMR), or a robot having movable robot arms. The mobile machine thus has a drive and can be moved in different directions.

The person can, for example, be an operator or a service engineer. The radio transponder or transponders are arranged on the clothing or on the equipment of the person, for example. It can here, for example, be a vest to which the radio transponders are firmly fixed. A radio transponder is arranged, for example, at the shoulders and in the chest and back areas. The radio transponders can, however, also be arranged at different locations on the person. Two radio transponders are, for example, arranged at the shoulders of a vest of a person.

The safety system is at least formed by the control and evaluation unit, the radio location system, and the spatially resolving sensor.

In a further development of the invention, position data of the person or of the object can be determined by means of the spatially resolving sensor.

The further development is based on the fact that a position of the person or of the object can be unambiguously identified by two mutually independent part systems in the passage zone. On the one hand, the position is determined via the spatially resolving sensor and the position that is determined by the radio location system. The position is thus determined by a redundant, in particular diverse, system.

The invention uses the combination of two diverse sensor technologies that mutually validate one another with respect to the detection task.

The first of the two sensor technologies is the radio location system or a radio based localization system by which the positions of radio transponders can be determined exactly to within a few centimeters.

The radio location is, here, for example, based on a triangulation of at least one radio transponder at the person or with the object. At least three radio stations that can detect the radio transponder are required for this purpose. The distance between the respective radio stations is known to the radio localization system here.

It is preferably a real time location system (RTLS). The radio transponder or radio transponders is/are here arranged at the person or at the object. The radio stations receive the radio signals from the radio transponders and can thus determine their position and so the position the person or of the object.

In this respect, position data are transmitted from the radio location system, namely the radio stations, to the control and evaluation unit.

The second system is the spatially resolving sensor or a spatially resolving environment detection system. No radio transponder is required for the localization here. This environment detection system or the spatially resolving sensor therefore delivers information that an object is located at a specific position and determines for example its position and dimensions or contour.

The two diverse part systems, namely the radio location system and the spatially resolving sensor, complement one another very well with respect to the functional tasks of position detection and can therefore be reciprocally combined for validation and so for a technical safety positioning.

A validation of an object position or person position could therefore schematically run as follows:

The radio location system determines the position of an object or of a person. This information is transmitted to the control and evaluation unit.

The control and evaluation unit optionally transmits a search field, in which the radio location system has located the person or object, to the spatially resolving sensor.

The spatially resolving sensor checks whether a person or an object is present in its detection zone or search field, optionally with its size and optionally other detected validation parameters such as shape, speed, etc. The spatially resolving sensor transmits the detected data to the control and evaluation unit.

The detected position of the person or of the object of the radio location system and the detected position of the person or object of the spatially resolving sensor are compared with one another by the control and evaluation unit.

The control and evaluation unit optionally compares the detected features or contour of the person or object of the spatially resolving sensor with the detected features or the contour of the person or object of the radio location system.

The person position or object position can thus be reciprocally validated by the two diverse information channels and can thus be checked for a safety technical application.

The spatially resolving sensor can, for example, be a spatially resolving sensor having respective differing or different detection technologies. The spatially resolving sensor can, for example, simply be a pressure mat.

The further development enables a safe position recognition of persons or objects in a monitored zone and thus opens up the option of tailoring a safety function specifically to a respective situation. There is thus the possibility of satisfying a demand for risk reduction without impairing productivity of an automation process.

The physical principles of action and their strengths and weaknesses of the diverse sensors are advantageously complementary. Radio location systems, for example, have a natural immunity to extraneous light due to the principle of action. Radio location systems are furthermore less sensitive with interfering objects such as dust, chips, or mist. In addition, it is possible by radio location systems to see through non-metallic walls so that a particularly early recognition of persons or objects is possible. This permits a high quality optimization of processes with a constant ensuring of occupational safety.

In a further development of the invention, the spatially resolving sensor is an optoelectronic sensor, an ultrasound sensor, or a radar sensor.

The position data or position information can be compared with safe or unsafe position data or position information that were/was detected at spots at specific locations in the operating environment with the aid of optical sensors.

The position data of the radar sensors typically have a higher range and can additionally be used to improve the position accuracy of the person or of the objects.

The ultrasound sensors typically have a similar accuracy and can additionally be used to improve the position accuracy of the person or of the objects.

In a further development of the invention, the spatially resolving sensor is configured for the at least areal monitoring of the passage region of the monitored zone.

The spatially resolving sensor for the at least areal monitoring of a passage region is a sensor for distance measurement. The distance sensor delivers distance values in at least a two-dimensional surface. In so doing, the sensor outputs measured values with distance indications and angle indications. For example, the distance is determined by means of time of flight methods or triangulation methods.

In a further development of the invention, the spatially resolving sensor is configured for the at least spatial monitoring of a passage zone.

In a further development of the invention, the optoelectronic sensor is a laser scanner, a safety laser scanner, a 3D camera, a 2D camera, a camera, a stereo camera, or a time of flight camera.

Especially the passage zones are then monitored by safe 3D cameras attached as stationary with the aid of the integrated protected field function such that the transition of a person from the outside into the passage zone or conversely from the passage zone into an adjacent sector is reliably detected. This detection is spatially resolved in that it can distinguish the sector or sectors in which a passing through event took place via the fields in the passage zone that are spatially separate from one another.

An example is the comparison with the position data that were determined in the field of vision of an optical sensor, for example a 3D camera. It can be in an intersection zone as the passage zone, for example. The position relative to the 3D camera is determined in this process on the detection of an object in the field of vision and the global position of the object is derived using the known position of the 3D camera. In this respect, both statically arranged optical sensors and mobile optical sensors whose position and orientation are known through other sources are provided. A check is subsequently made as to whether an object that matches this position value is in a list of the objects tracked by means of radio location. On sufficient agreement, the position value of the radio location is deemed checked. In this case, a diverse redundant approach has confirmed the measurement.

A camera, a 2D camera, in particular a 2D infrared camera can also be provided, however. The 2D infrared camera detects the emitted heat of the persons and can thus detect them. Persons can thus be distinguished from objects such as items. 3D infrared cameras can also be provided here.

The optical position data typically have a better accuracy and can additionally be used to improve the position accuracy of the person or of the mobile machine.

The plausibility of a position value is therefore the greater, the better the agreement between the optical position determination and the radio location and the less ambiguous the association between the optical position determination and the radio location is also possible. In the above-shown case, the additional difficulty can, for example, be present that it is not possible to reliably determine whether a first radio location does not possibly also belong to a second optical localization and vice versa. Such ambiguities are considered in the plausibility. This consideration can also take place in that the association is carried out in a safety relevant manner such that a minimal deviation between the radio location and the optical position results. It can alternatively also take place in that preceding position values are followed or tracked and the association is made such that the interval from the preceding measurement is minimized.

However, light grids or multi-beam light barriers can also be provided as the optoelectronic sensor. Solid state laser scanners can furthermore also be provided that do not have any movable or rotationally movable parts. Person counting systems or person counting sensors can furthermore also be used. They likewise have at least one camera.

In a further development of the invention, the control and evaluation unit is configured to form checked position data on an agreement of the position data of the radio location system and the position data of the sensor in a passage zone.

In accordance with the further development, position data usable in a technical safety manner are provided. This means that the position data of all the persons and objects thus acquired can be used as the basis for a comprehensive, forward-looking, and productivity optimizing securing concept.

The present further development thus also makes it possible in the event of error prone radio location information to make a check in the operating environment that it can be used in a technical safety manner in the sense of machine safety. It is discovered in this process when localization errors occur outside a specified tolerance range, for example due to radio signals being too weak. Defective localization information is corrected where possible in this process and is made usable for further use. If this is not possible, an error control measure is initiated; the position value is marked as erroneous, for example.

The localization information, position information, or position data present are thus checked with respect to their reliability. A degree of reliability required for the further use can furthermore be associated with the position data.

In a further development of the invention, the sectors are spaced apart and spatially separate from one another. Either passage zones are then arranged between the sectors or the sectors are arranged spatially separated from one another. Shelf aisles form the sectors, for example, with cross-aisles between shelf aisles forming passage zones.

In a further development of the invention, the control and evaluation unit is configured to respectively determine a position of the radio transponders at different points in time and to determine a speed, an acceleration, a direction of movement and/or a path (trajectory) of the radio transponders from it.

A comparison takes place, for example, with the predictions of a trajectory estimate while taking account of known properties of the mobile participant or of the object or of the person.

An expectation of the position measurement or of the position data is also checked here and the expected position data are compared with the determined measurement value or the determined position data. The movement of persons is namely subject to limits with regard to acceleration and speed. There is also the expectation of the direction of movement with mobile objects or vehicles. These expectations can make predictions on future positions in the form of movement estimators such as Kalman filters and these estimates are then used for the plausibilization of the real measurement values or position data.

A route of an object, of a mobile machine, or of a vehicle can thereby be tracked, for example, and an action can, for example, be triggered in dependence on the direction of movement or on the movement speed. The object can, for example, be positioned with target precision.

In a further development of the invention, the radio transponder has at least one time measurement unit, with the radio stations likewise respectively having at least one time measuring unit, with the radio stations being configured to read and describe the times of the time measurement units of the radio transponders and with the radio stations being configured to synchronize the times of the time measurement units of the radio transponders and with the radio stations being configured to compare the times of the time measurement units of the radio transponders with the times of the time measurement units of the radio stations.

A more precise position determination is thereby possible that can also be carried out permanently precisely by the synchronization, in particular with moving objects.

In a further development of the invention, checked position data are formed on the basis of the position data of the radio location system and of the position data of the sensor, with the control and evaluation unit being configured to compare the checked position data with reference data and on an agreement a change of the safety function takes place by means of the control and evaluation unit in the sector of the safety system.

In accordance with the further development of the invention, a safe collaboration between the movable machine or the actuator and the person can be implemented. Depending on the position, speed, direction of movement, and/or the distance of the person, the movable machine or the actuator is braked, stopped, diverted, and/or accelerated again.

The movable machine is in particular operated in a non-dangerous operating mode when the person or object is located in a hazardous zone of the movable machine.

Safety critical error cases such as the loss of the radio signal, e.g. because no radio transponder is present, because an energy supply of the radio transponder has failed, or because, for example, the radio transponder is screened, or an erroneous localization of the person or object by the spatially resolving sensor, or the defective processing of position data by the control and evaluation unit, result in a safety relevant shutting down by the primary safety function, namely by the control and evaluation unit, if no valid position data from the spatially resolving sensor are present.

A change of the safety function of the safety function of the safety system takes place on the basis of position data by means of the control and evaluation unit.

If a predetermined position has been recognized that is stored, for example, the control and evaluation unit can switch over to a different protective measure or safety function. The switching over of the protective measure can comprise, for example, a switching over of measured data contours, a switching over of protected fields, a parameter or shape matching of measured data contours or protected fields, and/or a switching over of the properties of a protected field. The properties of a protected field include, for example, the resolution and/or the response time. A switching over of the protective measure can also be a safety function such as a force restriction of the drive to which the switchover is made.

In a further development of the invention, the control and evaluation unit is configured to set a changed safety function in the sector on the basis of the checked position data of the control and evaluation unit, with a movement of the object being changed or influenced by the control and evaluation unit in dependence on the distance of the person from the object.

For example, a changed safety function is set by means of the control and evaluation unit, with the control and evaluation unit converting the checked position information into a safe distance from the hazard site and influencing a movement of the object in dependence on the distance from the person.

In accordance with the further development of the invention, a safe collaboration between the object and the person can likewise be implemented. Depending on the position, speed, direction of movement, and/or the distance of the person, the object is braked, stopped, diverted, and/or accelerated again.

In a further development of the invention, the radio location system is an ultra wideband radio location system, with the frequency used being in the range from 3.1 GHz to 10.6 GHz, with the transmission energy per radio station amounting to a maximum of 0.5 mW.

An absolute bandwidth in an ultra wideband radio location system amounts to at least 500 MHz or a relative bandwidth amounts to at least 20% of the central frequency.

The range of such a radio location system amounts, for example, to 0 to 50 m. In this respect, the short time duration of the radio pulses is used for the localization.

The radio location system thus only transmits radio waves having a low energy. The system can be used very flexibly and has no interference.

A plurality of radio stations, for example more than three, are preferably arranged that monitor at least some of the movement zone of the person or of the object.

In a further development of the invention, a machine in its sector is controlled in dependence on the currently present status information for the respective sector. For example, the operating mode of the machine is changed in dependence on the status information; for example a hazardous movement of the machine is slowed down or stopped or is accelerated or started.

For example, a change of an order of process steps of an automation routine of a plant takes place on the basis of the status information by means of the control and evaluation unit.

A traffic light can furthermore be provided at or in front of the passage zones.

A person can, for example, see with reference to the traffic light whether his radio transponder is working properly, that is that he can or may enter the passage zone. The radio transponder is checked by the radio stations, for example. The traffic light can, for example, be formed by a screen on which text and other color markings are presented. The traffic light can alternatively be a simple display lamp, for example. The traffic light visually represents different statuses. E.g. no entry by the color red since the radio transponder does not work, for example. It is, for example, indicated by the color green that entry is allowed and that the radio transponder is working correctly. If, for example, a check is also made that the radio transponder is being correctly worn, this criterion is also satisfied. For example, the color yellow can be provided for the report that the radio transponder is admittedly working, but that a rechargeable battery of the radio transponder has to be charged soon, for example, or the maximum number of radio transponders in the respective passage zone or in a monitored zone has almost been reached, for example. The traffic light can, for example, also be integrated in a turnstile, a door, for a sliding door plant. Alternatively, the traffic light or a display LED can be controlled from a door switch or the spatially resolving sensor by an entry system to use this display as a traffic light.

The invention will also be explained in the following with respect to further advantages and features with reference to the enclosed drawing and to embodiments. The Figures of the drawing show in.

BRIEF DESCRIPTION OF THE DRAWINGS

DETAILED DESCRIPTION OF THE INVENTION

In the following Figures, identical parts are provided with identical reference numerals.

Figure 1:
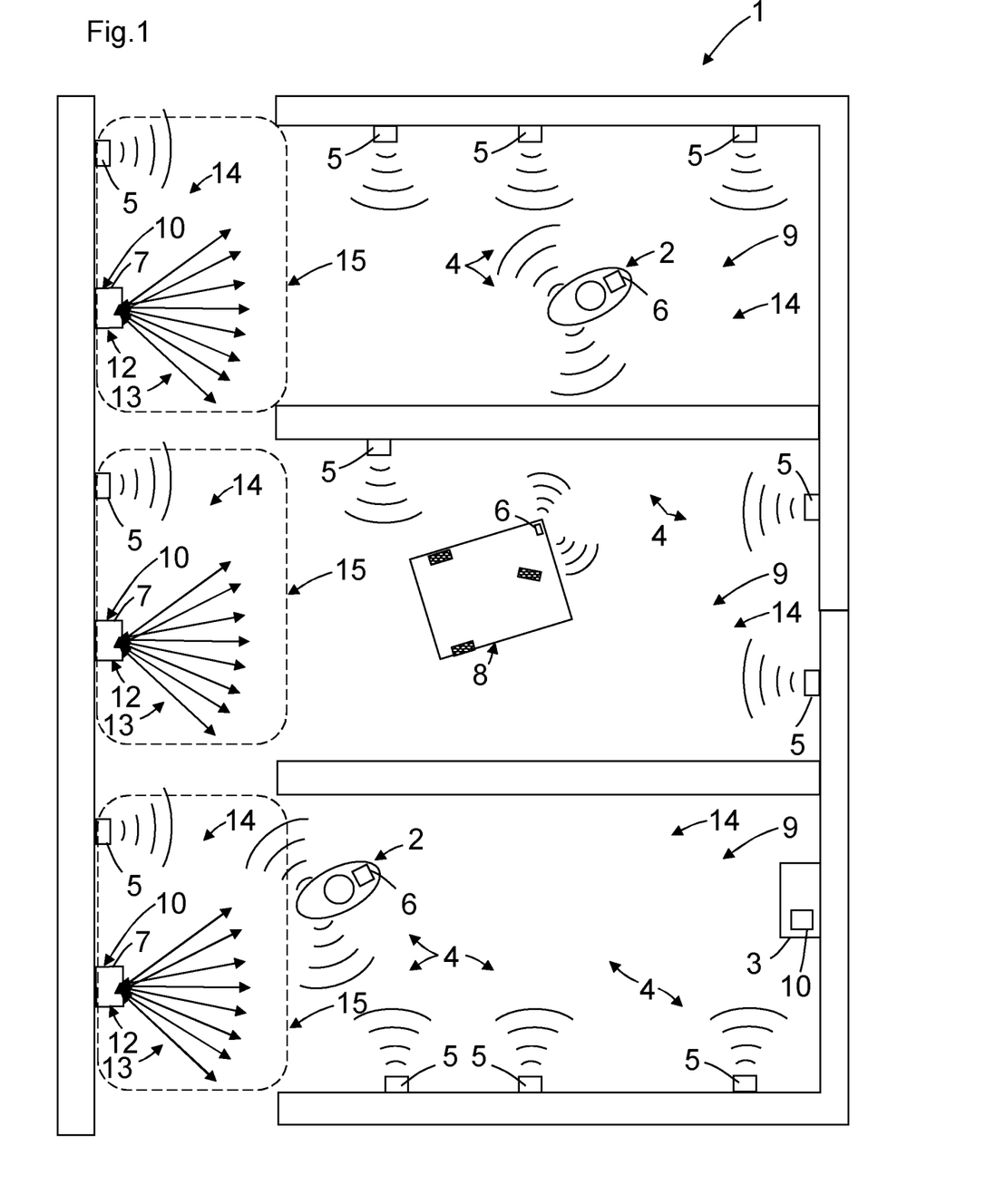
FIG. 1 and FIG. 2 respectively a safety system.

FIG. 1 shows a safety system 1 for localizing at least one person 2 or at least one object 8 in a monitored zone 14, having at least one control and evaluation unit 3, having at least one radio location system 4, and having at least one spatially resolving sensor 7 for the position determination of the person 2 or object 8, wherein the radio location system 4 has arranged radio stations 5, wherein at least one radio transponder 6 is arranged at the person 2 or object 8, wherein position data of the person 2 or object 8 can be determined by means of the radio location system 4, wherein the position data can be transmitted from the radio stations 5 of the radio location system 4 to the control and evaluation unit 3, at least presence data of the person 2 or of the object 8 can be determined by means of the spatially resolving sensor 7, wherein the monitored zone 14 has a plurality of sectors 9 and a plurality of passage zones 14 between the sectors 9, wherein at least one spatially resolving sensor 10 is associated with each passage zone 15, and wherein the control and evaluation unit 3 is configured to cyclically compare the position data of the radio location system 4 and the presence data of the spatially resolving sensor 7 in each respective passage zone 15 and to cyclically form status information for the sector 9.

Position information of present persons 2 that are usable in a technical safety manner are thus not determined at every point in time and for all positions, but rather only in the defined passage zones 15 of the monitored zone 14. The position information usable in a technical safety manner is thus reduced to the knowledge of the zone or passage zone 15 in which a person 2 is located. The position is admittedly likewise known within a sector 9 by the radio location, but is initially not relevant to safety functions due to the missing technical safety check.

The passage zones 15 can also synonymously be called transition zones.

In accordance with FIG. 1, the operating environment can be divided into different sectors 9 such that transitions are only possible between these sectors 9 via defined passage regions or zones 15. This requirement is present, for example, at doors or at entrances to shelf aisles.

In addition to the detection of the passing through event, which radio transponders 6 are located in the passage zone 15 or in direct spatial proximity to the corresponding protected field 13 of the spatially resolving sensor 7 at this point in time is detected and the corresponding radio transponder ID is associated with the detected event, for example. The radio transponders 6 detected in the operating environment can thereby be unambiguously and safely associated with a specific passage zone 15. The resulting status of the corresponding sector 9 is then "Person present" or "Potential hazard" in the corresponding sector 9.

Conversely, a sector is given the status "Free" or "No hazard" when no radio transponder 6 and thus no person 2 is located in the sector 9. In this case, machines 11 can, for example, be operated at maximum operating speed, local securing functions can be bridged, or, for example, the corresponding sectors 9 can be declared preferred routes for autonomous vehicles.

The safe presence information is provided by the spatially resolving sensor 7 with the aid of a presence detection in a defined protected zone, in this case the passage zone 15. The checking of position information of the radio location is therefore here initially not necessary at all, but is carried out additionally in the fields of vision of the spatially resolving sensor 7.

The information of the radio location system 4 is necessary in addition to the safe presence detection of the spatially resolving sensor 7 because a protected field-based system can admittedly very reliably detect passing through events in the passage zones 15 between sectors 9, but does not need to be able to remember the passing through events. This means that the case that two persons 2 simultaneously enter a sector 9, but that then only one person 2 departs the sector 9 again does not have to be distinguished by the spatially resolving sensor 7 from the case in which both persons 2 depart the sector 9 again. This distinction is, however, absolutely necessary for the technical safety use.

This problem can, however, be solved by the use of a radio location system 4 and by the exact association of a detected passing through event of a radio transponder 6 or, for example, of a unique ID of a radio transponder 6. The safe association is successful in that the independently acquired diverse position information from the spatially resolving sensor 7 and from the radio location system 4 are compared with one another on passing through the passage zone 15 and it is thus possible to unambiguously and safely deduce which persons 2 or which radio transponder 6 are/is located in a sector 9 or in a passage zone 15. It is therefore no longer necessary to count passing through events to obtain the information on the presence of persons 2 in a sector 9. The knowledge of the unique radio transponder 6 and the tracking or following of these radio transponders 6 in the monitored zone 14 is very much more reliable.

In addition, a degree of plausibility for further technical safety use can be determined from the agreement between the position of the radio location and the position of the protected zone 13 of the spatially resolving sensor 7.

The statuses of all the sectors 9 are determined via the control and evaluation unit 3, a central control, for example, that receives as the input data both the radio transponder positions determined by the radio location system 4, for example an RTLS system, and the switched information of the protected zones 13 of all the stationary spatially resolving sensors 7. The control and evaluation unit 3 can, for example, be a safety control or alternatively also an unsafe control that uses additional plausibilization mechanisms of data processing.

The control and evaluation unit 3, that is designed as a central control, for example, cyclically continuously carries out the following steps, for example:

1. Determining position information of the radio location system 4.
2. Detecting information for passage zones 15 or sector transitions, with this information being determined by the stationary spatially resolving sensors 7 and being transmitted to the control and evaluation unit 3.
3. On the presence of a passing through event: Associating between the radio transponder 6 and position information of the spatially resolving sensor 7.
4. Setting a status of each sector 9 on the respective hazard status.
5. Optionally, initiating measures to minimize risk for the different sectors 9.

The sector-specific status information can be used for risk reduction in different manners.

In accordance with a simple approach, a machine 11 or a travel movement of an object 8 in a sector 9 is stopped, for example, as soon as the sector status signals the presence of a person 2. This kind of risk reduction has the advantage of low complexity, but suffers from the known productivity losses. Advantages nevertheless result here in that the range limitation of local securing sensors is omitted. An example is the speed limit of very narrow aisle trucks. The speeds of these vehicles are limited by the range of the "moving" protected fields. An enlargement of the fields is not sensible for energetic reasons and for practical application reasons. If, however, the information is present that no person 2 is reliably present in the narrow aisle zone, the speed limitation can be overcome.

Conversely, the sector status can also be expanded by the presence information on moving hazard sites, in particular autonomous vehicles. Persons 2 can thus be warned on an approach to the respective sector 9 or can be prevented from passing through into the sector 9 with the aid of door bolts.

The sector status can also be used for a cascaded risk reduction strategy in which the movements of the machines 11 or objects 8, e.g. vehicles, are slowed down on a person 2 entering a sector 9 and there is thus a smaller risk for the person 2 present. This residual risk can then either be acceptable or can be further reduced by supplemental local securing measures. For example by safety sensors having a smaller safety level.

The sector status can additionally be used for dynamic route planning of vehicles. A sector 9 having the status "Free/No person present" can be declared a preferred route. Conversely, a sector 9 with persons 2 present can be blocked for the traveling through of autonomous vehicles and the vehicles can be diverted to other routes.

If the information is present for a sector 9 that no person 2 is located there, the function of local securing sensors can be bridged with this information. This improves the availability of the machines 11 and thus their productivity in that unwanted erroneous shutdowns are avoided.

The radio transponders 6, for example, have identification, with a respective radio transponder 6 being associated with at least either one person 2 or one mobile object 8, whereby the control and evaluation unit 3 is configured to distinguish and respectively identify the persons 2 and mobile objects 8.

The spatially resolving sensor 7 and the radio stations 5 are preferably arranged as stationary.

At least one spatially resolving sensor 7 is, for example, associated with each passage zone 15.

The radio location is, here, for example, based on a triangulation of at least one radio transponder 6 at the person 2 or object 8. At least three radio stations 5 that can detect the radio transponder 6 are required for this purpose. The distance between the respective radio stations 5 is known to the radio location system 4 here.

In this respect, the position data are transmitted from the radio location system 4, namely the radio stations 5, to the control and evaluation unit 3.

The second system is the spatially resolving sensor 7 or a spatially resolving environment detection system. No radio transponder 6 is required for the localization here. This environment detection system or the spatially resolving sensor 7 therefore delivers information that an object 8 is located at a specific position and determines for example its position and dimensions or contour.

In accordance with FIG. 1, the spatially resolving sensor 7 is for example an optoelectronic sensor 10. The spatially resolving sensor 7 can, however, also be an ultrasound sensor or a radar sensor.

The position data or position information can be compared with safe or unsafe position data or position information that were/was detected at spots at specific locations in the operating environment, namely the passage zones 15, with the aid of optoelectronic sensors 10.

In accordance with FIG. 1, the spatially resolving sensor 7 is configured, for example, for the at least areal monitoring of the passage region 15 of the monitored zone 14.

The spatially resolving sensor 7 for the at least areal monitoring of a passage region 15 is a sensor for distance measurement. The distance sensor delivers distance values in at least two-dimensional space. In so doing, the sensor 7 outputs measured values with distance indications and angle indications. For example, the distance is determined by means of time of flight methods or triangulation methods or stereoscopy.

The spatially resolving sensor 7 is, for example, configured for the at least spatial monitoring of a passage region zone 15.

In accordance with FIG. 1, the optoelectronic sensor 10 is, for example, a laser scanner, a safety laser scanner, a 3D camera, a stereo camera, or a time of flight camera.

Especially the passage zones 15 are then monitored by safe 3D cameras attached as stationary with the aid of the integrated protected field function such that the transition of a person 2 from the outside into the passage zone 15 or conversely from the passage zone 15 into an adjacent sector 9 is reliably detected. This detection is spatially resolved in that it can distinguish the sector or sectors 9 in which a passing through event took place via the fields in the passage zone 15 that are spatially separate from one another.

An example is the comparison with the position data that were determined in the field of vision of an optical sensor 10, for example a 3D camera. It can be in an intersection zone as the passage zone 15, for example. The position relative to the 3D camera is determined in this process on the detection of an object 8 in the field of vision and the global position of the object 8 is derived using the known position of the 3D camera. In this respect, both statically arranged optoelectronic sensors 10 and mobile optoelectronic sensors 10 whose position and orientation are known through other sources are provided. A check is subsequently made as to whether an object 8 that matches this position value is in a list of the objects 8 tracked by means of radio location. On sufficient agreement, the position value of the radio location is deemed checked. In this case, a diverse redundant approach has confirmed the measurement.

For example, the control and evaluation unit 3 is configured to form checked position data on an agreement of the position data of the radio location system and the position data of the sensor 7 in a passage zone 15.

Position data usable in a technical safety manner are thus provided. This means that the position data of all persons 2 and objects 8 thus acquired can be used as the basis for a comprehensive, forward-looking, and productivity optimizing securing concept.

In accordance with FIG. 1, sectors 9 are, for example, spaced apart and spatially separate from one another. Either passage zones 15 are then arranged between the sectors 9 or the sectors 9 are arranged spatially separate from one another. Shelf aisles form the sectors 9, for example, with cross-aisles between shelf aisles forming passage zones 15.

Figure 2:
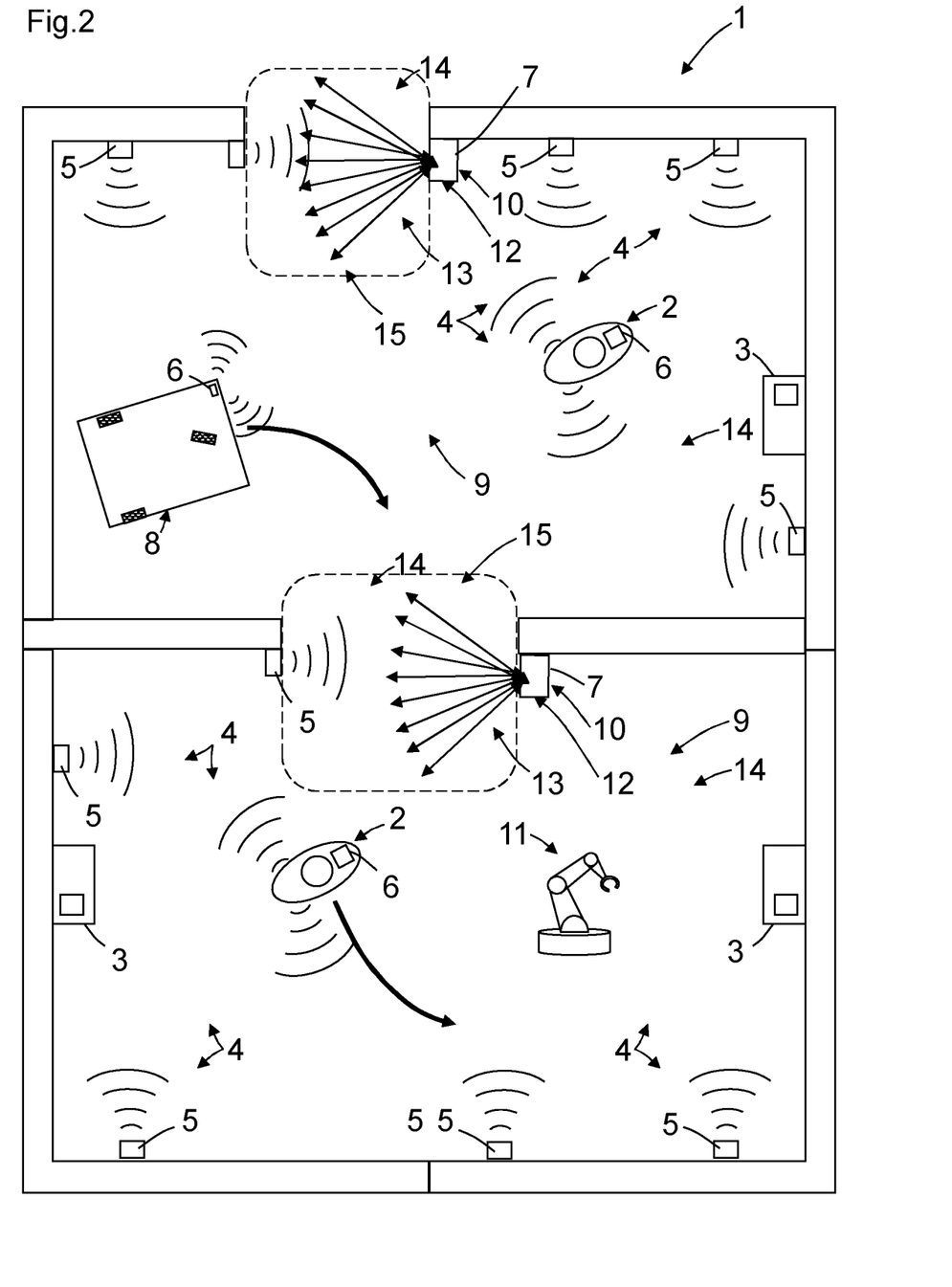

In accordance with FIG. 2, the control and evaluation unit 3 is configured to respectively determine a position of the radio transponders 6 at different points in time and to determine a speed, an acceleration, a direction of movement and/or a path (trajectory) of the radio transponders 6 from it.

A comparison takes place, for example, with the predictions of a trajectory estimate while taking account of known properties of the mobile participant or of the object 8 or of the person 2.

A route of an object 8, of a mobile machine, or of a vehicle can thereby be tracked, for example, and an action can, for example, be triggered in dependence on the direction of movement or on the movement speed. The object 8 can, for example, be positioned with target precision.

For example, checked position data are formed on the basis of the position data of the radio location system 4 and of the position data of the sensor, 7 with the control and evaluation unit 3 being configured to compare the checked position data with reference data and on an agreement a change of the safety function takes place by means of the control and evaluation unit 3 in the sector 9 of the safety system 1.

A safe collaboration between the object 8 or movable machine or actuator and person 2 can thus be implemented. Depending on the position, speed, direction of movement, and/or the distance of the person 2, the object 8, the movable machine or the actuator is braked, stopped, diverted, and/or accelerated again.

The movable machine is in particular operated in a non-dangerous operating mode when the person 2 or object 8 is located in a hazardous zone of the movable machine.

A change of the safety function of the safety function of the safety system 1 can take place on the basis of position data by means of the control and evaluation unit 3.

If a predetermined position has been recognized that is stored, for example, the control and evaluation unit 3 can switch over to a different protective measure or safety function. The switching over of the protective measure can comprise, for example, a switching over of measured data contours, a switching over of protected fields, a parameter or shape matching of measured data contours or protected fields 13, and/or a switching over of the properties of a protected field 13. The properties of a protected field 13 include, for example, the resolution and/or the response time of the protected field 13. A switching over of the protective measure can also be a safety function such as a force restriction of the drive to which the switchover is made.

In accordance with FIG. 1 the control and evaluation unit 3 is configured, for example, to set a changed safety function in the sector 9 on the basis of the checked position data of the control and evaluation unit 3, with a movement of the object 8 being changed or influenced by the control and evaluation unit 3 in dependence on the distance of the person 2 from the object 8.

For example, a changed safety function is set by means of the control and evaluation unit 3, with the control and evaluation unit 3 converting the checked position information into a safe distance from the hazard site and influencing a movement of the object 8 in dependence on the distance from the person 2.

In accordance with FIG. 2, a safe collaboration between the object 8 and the person 2 can likewise be implemented. Depending on the position, speed, direction of movement, and/or the distance of the person 2, the object 8 is braked, stopped, diverted, and/or accelerated again.

The radio location system 4 is preferably an ultra wide-band radio location system, with the frequency used being in the range from 3.1 GHz to 10.6 GHz, with the transmission energy amounting to a maximum of 0.5 mW per radio station.

A plurality of radio stations 5, for example more than three, are preferably arranged that monitor at least some of the movement zone of the person 2 or object 8.

REFERENCE NUMERALS 1 safety system
2 person
3 control and evaluation unit
4 radio location system
5 radio stations
6 radio transponder
7 spatially resolving sensor
8 object
9 sector
10 optoelectronic sensor
11 machine
12 3D camera
13 protected field/protected zone
14 monitored zone
15 passage zone

The invention claimed is:

1. A safety system for localizing at least one person or at least one object in a monitored zone, the safety system comprising:
at least one control and evaluation unit,
at least one radio location system, and
at least one spatially resolving sensor for a position determination of the person or object,
wherein the radio location system has arranged radio stations;
wherein at least one radio transponder is arranged at the person or object;
wherein position data of the person or object can be determined by means of the radio location system;
wherein the position data can be transmitted from the radio stations of the radio location system to the control and evaluation unit,
and at least presence data of the person or object can be determined by means of the spatially resolving sensor,
wherein the monitored zone has a plurality of sectors and a plurality of passage zones between the sectors,
wherein at least one spatially resolving sensor is associated with each passage zone,
with the control and evaluation unit being configured to cyclically compare the position data of the radio location system and the presence data of the spatially resolving sensor in each respective passage zone and to cyclically form status information for the sector, and
wherein the radio transponders each have at least one time measurement unit, with the radio stations likewise respectively having at least one time measuring unit, with the radio stations being configured to read and describe times of the time measurement units of the radio transponders and with the radio stations being configured to synchronize the times of the time measurement units of the radio transponders, and with the radio stations being configured to compare the times of the time measurement units of the radio transponders with times of the time measurement units of the radio stations.

2. The safety system in accordance with claim 1, wherein position data of the person or of the object can be determined by means of the spatially resolving sensor.

3. The safety system in accordance with claim 1, wherein the spatially resolving sensor is one of an optoelectronic sensor, an ultrasonic sensor, and a radar sensor.

4. The safety system in accordance with claim 1, wherein the spatially resolving sensor is configured for an at least area monitoring of a passage zone.

5. The safety system in accordance with claim 1, wherein the spatially resolving sensor is configured for at least a spatial monitoring of a passage zone.

6. The safety system in accordance with claim 1, wherein the optoelectronic sensor is one of a laser scanner, a safety laser scanner, a 3D camera, a 2D camera, a camera, a stereo camera, and a time of flight camera.

7. The safety system in accordance with claim 1, wherein the control and evaluation unit is configured to form checked position data on an agreement of the position data of the radio location system and the position data of the sensor in a passage zone.

8. The safety system in accordance with claim 1, wherein the sectors are spaced apart and are spatially separate from one another.

9. The safety system in accordance with claim 1, wherein the control and evaluation unit is configured to respectively determine a position of the radio transponders at different points in time and to determine a speed, an acceleration, a direction of movement and/or a path or trajectory of the radio transponders from it.

10. The safety system in accordance with claim 1, wherein checked position data are formed on a basis of the position data of the radio location system and of the position data of the sensor, with the control and evaluation unit being configured to compare the checked position data with reference data and on an agreement a change of the safety function of the safety system takes place by means of the control and evaluation unit in the passage zone of the safety system.

11. The safety system in accordance with claim 1, wherein the control and evaluation unit is configured to set a changed safety function in the passage zone on a basis of the checked position data of the control and evaluation unit, with a movement of the object being changed or influenced by the control and evaluation unit in dependence on a distance of a person from the object.

12. The safety system in accordance with claim 1, wherein the radio location system is an ultra-wideband radio location system, with the frequency used being in the range from 3.1 GHz to 10.6 GHz, with the transmission energy per radio station amounting to a maximum of 0.5 mW.

13. The safety system in accordance with claim 1, wherein a machine in its sector is controlled in dependence on currently present status information for the sector.

14. A method using a safety system for localizing at least one person or at least one object in a monitored zone, the safety system having least one control and evaluation unit, having at least one radio location system, and having at least one spatially resolving sensor for a position determination of the person or object, wherein the radio location system has arranged radio stations;

wherein at least one radio transponder is arranged at the person or object;

wherein position data of the person or object can be determined by means of the radio location system;

wherein the position data can be transmitted from the radio stations of the radio location system to the control and evaluation unit, and at least presence data of the person or object can be determined by means of the spatially resolving sensor, wherein the monitored zone has a plurality of sectors and a plurality of passage zones between the sectors, wherein at least one spatially resolving sensor is associated with each passage zone, with the control and evaluation unit being configured to cyclically compare the position data of the radio location system and the presence data of the spatially resolving sensor in each respective passage zone and to cyclically form status information for the sector, and wherein the radio transponders each have at least one time measurement unit, with the radio stations likewise respectively having at least one time measuring unit, with the radio stations being configured to read and describe times of the time measurement units of the radio transponders and with the radio stations being configured to synchronize the times of the time measurement units of the radio transponders, and with the radio stations being configured to compare the times of the time measurement units of the radio transponders with times of the time measurement units of the radio stations.

* * * * *